June 7, 1960 I. LEFKOWITZ 2,940,035

ELECTRICAL COMPONENT OF CERAMIC COMBINED WITH RESISTOR APPLIED TO THE SURFACE THEREOF

Filed Feb. 14, 1955

INVENTOR.
ISSAI LEFKOWITZ
BY
Cyrus D. Samuelson
ATTORNEY

United States Patent Office 2,940,035

Patented June 7, 1960

2,940,035

ELECTRICAL COMPONENT OF CERAMIC COMBINED WITH RESISTOR APPLIED TO THE SURFACE THEREOF

Issai Lefkowitz, Princeton Junction, N.J., assignor to Gulton Industries, Inc., Metuchen, N.J., a corporation of New Jersey Filed Feb. 14, 1955, Ser. No. 487,849

12 Claims. (Cl. 323—74)

My invention relates to electrical components and in particular to ceramic capacitors and piezoelectrics in combination, in a single unit, with each other and with resistors.

It is often necessary in certain applications wherein ceramic piezoelectrics are employed, to provide circuitry which will have a specific time delay or other electrical characteristics. Up to now, this additional electrical circuitry and the components making up these electrical circuits have been packaged separately from the ceramic piezoelectric themselves. This has necessitated the use of external connections from the ceramic piezoelectric to the electrical circuits being used. This technique has increased the space occupied by the system and has reduced their utility and usefulness. Whenever the ceramic piezoelectric and the associated electrical circuitry has been essential to the operation of the device being used, it has, because of space and weight limitations, often been necessary to eliminate some other useful feature of the device which is not absolutely essential to its functioning.

Accordingly, it is a principal object of my invention to provide a single-packaged multi-element electrical component.

It is a further object of my invention to provide a ceramic electrical unit containing several distinct piezoelectric elements, several distinct ceramic capacitive elements in combination with each other and/or several resistive elements.

Other objects and advantages of my invention will be apparent during the course of the following description.

Figure 1:
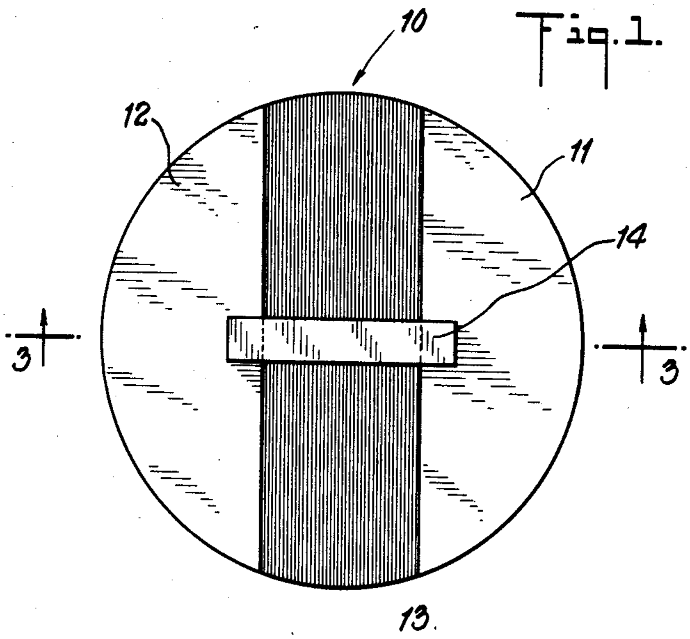
Figure 2:
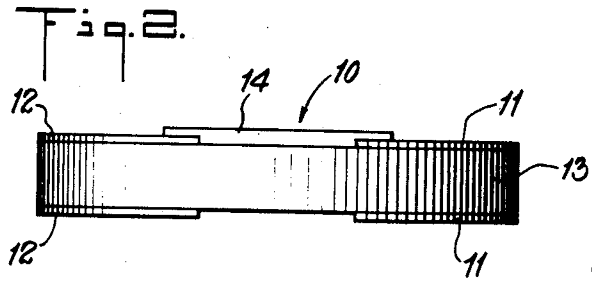
Figure 3:
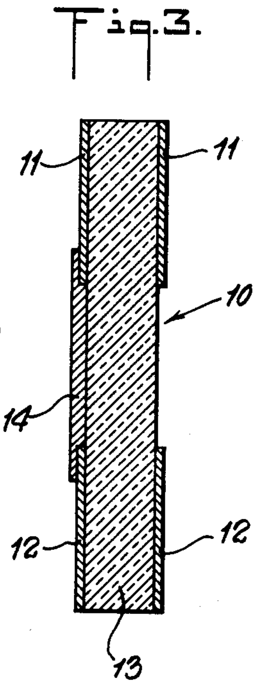
Figure 4:
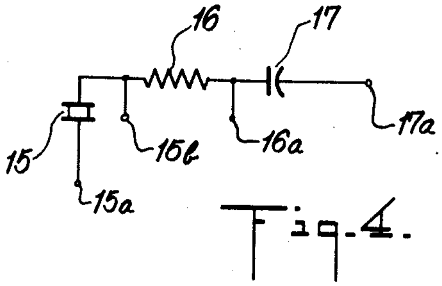

In the accompanying drawings, forming a part of this application, and in which like numerals are employed to designate like parts throughout the same, Figure 1 is a plan view of an embodiment of my invention, Figure 2 is a side elevation of the embodiment of Figure 1, Figure 3 is a cross-sectional view along the line 3—3, and Figure 4 is a schematic representation of one of the possible electrical combinations which may be obtained from the embodiment of Figures 1 through 3.

In the drawings, wherein for the purpose of illustration, is shown a preferred embodiment of my invention, the numeral 10 designates the component generally, the numeral 11 designates a pair of electrodes, the numeral 12 designates a second pair of electrode, and the numeral 13 designates the ceramic body portion. The numeral 14 designates the resistor, the numeral 15 designates a piezoelectric, schematically, the numeral 16 designates a resistor, schematically, and the numeral 17 designates a capacitor, schematically. The numerals **15*a*, 15*b*, 16*a* and 17*a* schematically designate electrical terminals associated with the electrical components. Ceramic 13 may be of titanate, steatite, niobate or similar material, a preferred form being composed largely of barium tintanate. The ceramic component 10 is formed, sintered and processed in the usual manner and the electrodes 11 and 12 are applied in accordance with the application in which the component 10 is to be utilized. Several distinct sets of electrodes may be deposited on, bonded to or reduced on the surfaces of ceramic 13, the two sets of electrodes 11 and 12** being shown as one possible manifestation and embodiment of my invention.

Resistor 14 is composed of a low-resistance material which may be cured at room temperature or at slightly elevated temperatures which are below the transformation temperature (Curie point) of the ceramic 13. This transformation temperature varies with the composition of the ceramic 13. Resistor 14 is in electrical contact with electrode 11 and electrode 12 in the embodiment illustrated in the figures. Another similar resistor may also be placed across the other set of electrodes. It is also feasible to place resistors between other sets of electrodes which are deposited on, bonded to or reduced on the surfaces of ceramic 13. The resistor material may also be utilized across the edges of the ceramic 13 such as between the two electrodes 11 in the event that it is desirable to provide a low resistance leakage patch across a piezoelectric or a capacitor.

The ohmic resistance of the resistor 14 is determined by the nature of the composition of the material of which it is made, the length and the width of the resistor. Figure 4 illustrates one possible combination of electrical elements which may be obtained from the embodiment illustrated in Figures 1 through 3. In this particular illustration, polarizing voltage has been applied between electrodes 11 or 12 to produce the piezoelectric ceramic 15. No polarizing voltage is applied across the other pair of electrodes so that a high dielectric capacitor 17 is obtained between the unpolarized electrodes 11 or 12. The resistor 16 is connected between one electrode 11 and one electrode 12, electrodes 11 and 12 being on the same surface of 13. Electrical connections are made to the terminals **15*a*, 15*b*, 16 and 17 in accordance with the circuit configuration desired. These terminals may be soldered or attached in any similar manner to the electrodes 11 and 12**. Or electrical connections may be made directly to the electrodes.

Polarization may be accomplished before or after the resistance material has been cured on the component without affecting the characteristics of the component, but polarization may not be accomplished after application of the resistance material if the resistor is electrically connected across the electrodes to which polarization voltage is to be applied. The polarization of one portion of the component 10 does not substantially affect the unpolarized portion of component 10. One portion of ceramic 13 may be polarized in one direction and another portion may be polarized in the same or in the opposite direction to obtain more than one piezoelectric element in the same component. There are a multitude of electrical circuit combinations possible with components manufactured in accordance with my invention, depending solely on the particular requirements of the final usage.

My invention also contemplates the application of resistive material to the ceramic in order to form spark gaps and similar devices. In these cases, some of the resistive material may be applied from each electrode toward the other electrode such that there is a space of insulating material between the ends of the separate elements of resistive material.

While I have shown only one embodiment of my invention, it will be recognized that this is only by way of illustration of general principles and that my invention is not limited to the particular means illustrated, but various changes, modifications, and alterations may be made without departing from the spirit and scope of the invention as defined in the appended claims.

Having thus described my invention, I claim:

1. An electrical component comprising an unpolarized integral ceramic body having a plurality of portions, a plurality of electrodes affixed to each of the surfaces of said ceramic body, one of the portions of said ceramic body being polarized to be piezoelectric, and a resistor applied to one of the surfaces of said ceramic body electrically connecting two of said electrodes on said surface.

2. An electrical component as described in claim 1 wherein said ceramic body is composed largely of titanate.

3. An electrical component as described in claim 1 wherein said ceramic body is composed largely of barium titanate.

4. An electrical component comprising an unpolarized integral ceramic body having a plurality of portions, a plurality of electrodes affixed to said ceramic body, one of the portions of said ceramic body being polarized to be piezoelectric, and a resistor applied to one of the surfaces of said body electrically connected to one of the electrodes on said surface.

5. An electrical component as described in claim 4 wherein said ceramic body is composed largely of titanate.

6. An electrical component as described in claim 4 wherein said ceramic body is composed largely of barium titanate.

7. An electrical component comprising an unpolarized integral ceramic body having a plurality of portions, one of the portions of said ceramic body being polarized to be piezoelectric, a plurality of pairs of electrodes affixed to said ceramic body, each said pair being affixed to said ceramic body such that one electrode of said pair is affixed to one surface of said ceramic body and the other electrode of said pair is affixed to the opposite surface of said ceramic body, and a resistor applied to one of the surfaces of said ceramic body electrically connecting two of the electrodes on said surface, said piezoelectric portion being disposed between one of said pairs of electrodes.

8. An electrical component as described in claim 7 wherein said ceramic body is composed largely of titanates.

9. An electrical component as described in claim 7 wherein said ceramic body is composed largely of barium titanate.

10. An electrical component comprising an unpolarized integral ceramic disc having a plurality of portions, one of the portions of said ceramic disc being polarized to be piezoelectric, a plurality of pairs of electrodes affixed to said ceramic disc, each said pair being affixed to said disc such that one electrode of said pair is affixed to one surface of said ceramic disc and the other electrode of said pair is affixed to the opposite surface of said ceramic disc and a resistor applied to one of the surfaces of said ceramic disc electrically connecting two of the electrodes one said surface, said piezoelectric portion being disposed between one of said pairs of electrodes.

11. An electrical component as described in claim 10 wherein said ceramic disc is composed largely of titanates.

12. An electrical component as described in claim 10 wherein said ceramic disc is composed largely of barium titanate.

References Cited in the file of this patent

UNITED STATES PATENTS

| | | |
|---|---|---|
| 2,540,187 | Cherry | Feb. 6, 1951 |
| 2,691,159 | Hiebel | Oct. 5, 1954 |
| 2,694,185 | Kodama | Nov. 9, 1954 |
| 2,769,867 | Crownover et al. | Nov. 6, 1956 |
| 2,828,454 | Khowi | Mar. 25, 1958 |
| 2,838,723 | Crownover et al. | June 10, 1958 |

FOREIGN PATENTS

| | | |
|---|---|---|
| 570,043 | Great Britain | June 20, 1945 |
| 976,455 | France | Oct. 25, 1950 |

UNITED STATES PATENT OFFICE

CERTIFICATE OF CORRECTION

June 7, 1960

Patent No. 2,940,035

Issai Lefkowitz

It is hereby certified that error appears in the printed specification of the above numbered patent requiring correction and that the said Letters Patent should read as corrected below.

Column 4, line 20, for "one said surface" read -- on said surface --.

Signed and sealed this 1st day of November 1960.

(SEAL)
Attest:

KARL H. AXLINE
Attesting Officer

ROBERT C. WATSON
Commissioner of Patents